US007788466B2

(12) United States Patent
Van Den Berg et al.

(10) Patent No.: US 7,788,466 B2
(45) Date of Patent: Aug. 31, 2010

(54) INTEGRATED CIRCUIT WITH A PLURALITY OF COMMUNICATING DIGITAL SIGNAL PROCESSORS

(75) Inventors: Henricus Hubertus Van Den Berg, Nijmegen (NL); Evert-Jan Daniël Pol, Eindhoven (NL)

(73) Assignee: NXP B.V., Eindhoven (NL)

( * ) Notice: Subject to any disclaimer, the term of this patent is extended or adjusted under 35 U.S.C. 154(b) by 864 days.

(21) Appl. No.: 10/571,814

(22) PCT Filed: Sep. 3, 2004

(86) PCT No.: PCT/IB2004/051685

§ 371 (c)(1),
(2), (4) Date: Mar. 15, 2006

(87) PCT Pub. No.: WO2005/029347

PCT Pub. Date: Mar. 31, 2005

(65) Prior Publication Data

US 2007/0079107 A1    Apr. 5, 2007

(30) Foreign Application Priority Data

Sep. 19, 2003    (EP)    ................... 03103460

(51) Int. Cl.
*G06F 15/76* (2006.01)
*G06F 15/00* (2006.01)
(52) U.S. Cl. .......................... 712/11; 712/34
(58) Field of Classification Search ............ 712/34, 712/11
See application file for complete search history.

(56) References Cited

U.S. PATENT DOCUMENTS

| 5,187,796 | A  | * | 2/1993  | Wang et al. ............. 712/4 |
| 5,689,647 | A  | * | 11/1997 | Miura ..................... 712/11 |
| 6,487,213 | B1 | * | 11/2002 | Chao ...................... 370/418 |
| 2002/0027912 | A1 | * | 3/2002 | Galicki et al. .......... 370/389 |

FOREIGN PATENT DOCUMENTS

EP    675446 A1 *    10/1995

* cited by examiner

*Primary Examiner*—Eddie P Chan
*Assistant Examiner*—William B Partridge

(57)    ABSTRACT

A plurality of digital signal processors (10), each contains a signal processing core (22), a memory (20) coupled to the processing core (22) and a multiplexed data input (16) coupled to the memory (20). Each digital signal processor has a plurality of outputs for outputting data from the signal processing core (22). A remote write only structure (14a-d) couples outputs of respective groups of the digital signal processors (10) each to the multiplexed data input (16) of respective particular digital signal processor (10), the respective group for the particular digital signal processor (10) not including the particular digital signal processor (10). Thus, each processor (10) writes data for other processors directly from the processor, without storing the data in memory first for handling by an I/O processor, and reads data from other processors (10) via memory, where it is received via an input that does not share resources with the output of the processor (10).

9 Claims, 2 Drawing Sheets

INTEGRATED CIRCUIT WITH A PLURALITY OF COMMUNICATING DIGITAL SIGNAL PROCESSORS

The invention relates to an integrated circuit with a plurality of communicating digital signal processors, and in particular with an integrated circuit that contains a two dimensional matrix of such digital signal processors.

An integrated circuit comprising a plurality of digital signal processors is known from an article by B. Ackland et al, titled "A single-chip 1.6 Billion 16b MAC/s Multiprocessor DSP" and published in the proceedings of the IEEE Custom Integrated Circuits Conference, San Diego Calif., May 1999, page 537-540. This document discloses an integrated circuit with sixty-four digital signal processors. Each processor is provided with a cache memory and each is capable of executing its own program.

One important design aspect of such a multiprocessor is the communication structure that is used to communicate data between different processors. The article by Ackland et al. discloses use of a common split transaction bus, to which a plurality of processors is connected, as well as a common memory that all processors can access via the bus. Ackland et al. point out that this bus is a potential bottleneck because it is a shared resource. A round robin arbitration scheme is used to prevent bus conflicts. The bottleneck effect of the bus is partly solved by splitting transactions on the bus.

Notwithstanding these measures, use of a bus via which all of the connected processors write data for use by the other connected processors still causes a considerable reduction in processing speed.

Among others, it is an object of the invention to provide for an integrated circuit with a plurality of communicating digital signal processors wherein bottleneck problems are efficiently reduced.

The invention provides for an integrated circuit according to claim 1. According to the invention a local read/remote write scheme is used to communicate data between the digital signal processors. That is, it is prevented that a particular digital signal processor that has to write data can cause a bus conflict with other processors that have to write data for that particular processor via a shared resource.

Digital signal processors are often used to implement dataflow type applications. In many data-flow type of applications, many of the conflicts for access to a shared bus arise between digital signal processors that implement connected nodes in the data flow-graph, the one sending data, the other receiving data. A programmable integrated circuit can therefore support such applications more efficiently by providing shared resources that are each dedicated to write data for use by a particular digital signal processor, so that the particular digital signal processor to which the data is written does not have to use the shared resource for its own writing.

Furthermore, the connections are simplified, because they have to support only one type of action (writing).

For each particular digital signal processor a group of digital signal processors is defined that share a resource for writing data for use by a particular digital signal processor. Preferably, each particular digital signal processors has its own respective group of processor that share the resource for writing to the particular digital signal processors. This further reduces the number of conflicts.

The invention is particularly useful for an integrated circuit wherein the digital signal processors are arranged in a two-dimensional matrix, and the connections are arranged so that the groups of digital signal processors that share a write resource of a particular digital signal processor each consist of the neighbors (e.g. North, East, South, West, or North, Northeast, East, Southeast, South, Southwest, West, Northwest) of that particular digital signal processor in the matrix. As a result the matrix of digital signal processors is particularly suitable for executing data flow types of applications. Moreover, the matrix is easily scaleable, since the local design does not depend on the size of the matrix.

In another embodiment full connections are used, each processor communicating with each other processor. This provides maximum programming flexibility, but it requires a large number of connections, which may be disadvantageous if the number of processors is large. In another embodiment programmed processors are coupled only to those other processors that their programs send data to. This may be realized when the final layout of the integrated circuit and the programs are developed together. Thus, maximum communication possibilities are realized with minimum connections, be it at the expense of flexibility.

Preferably, each particular digital signal processor reserves a plurality of buffer memory areas, each for a different one of the digital signal processors that is able to write to the particular digital signal processor. Double copies of administration memory areas are reserved for each buffer memory area, one in the particular digital signal processor and one in the digital signal processor that writes to the buffer memory area Thus, a digital signal processor that has to write to a particular digital signal processor can check the status of the buffer memory area before writing, further reducing the risk of unnecessary resource conflicts.

Preferably, each particular digital signal processor reserves a plurality of buffer memory areas, each for data from the same digital signal processor, but each for receiving data according to a different protocol. Thus, a more flexible use can be made of the digital signal processors.

In an embodiment, each particular processor comprises an arbiter for arbitrating use of the input between the digital signal processors of its group. The arbiter may use a round robin scheme, a budget based scheme or a priority based scheme to ensure that no one of the processors will be starved. The particular scheme that is used is preferably selected dependent on the application program with which the digital signal processors are programmed, so as to meet real time processing specifications and/or so as to minimize the time needed to execute the programs.

These and other objects and advantageous aspects of the invention will be illustrated in the description of the following figures.

Figure 1:
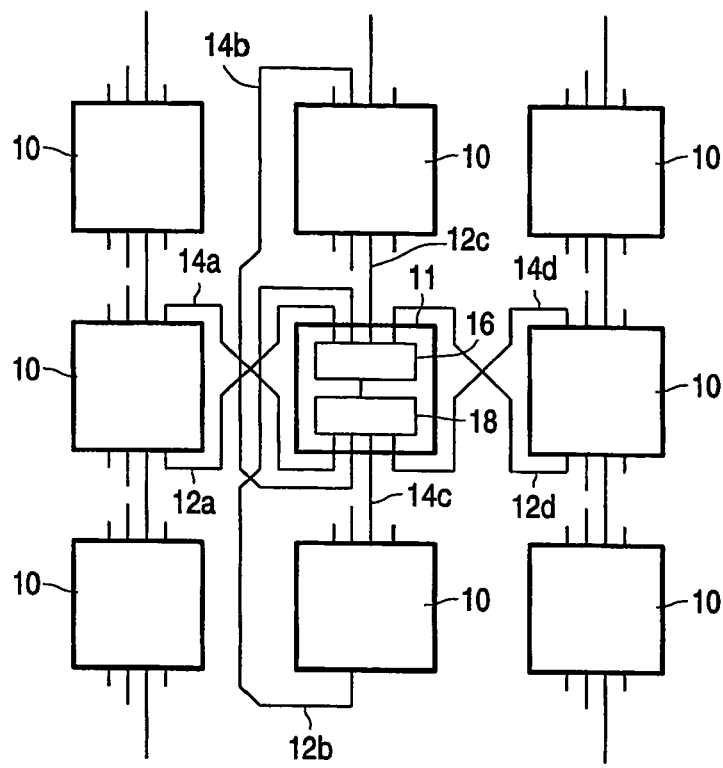
FIG. 1 shows part of a matrix of digital signal processors

FIG. 1 shows part of a matrix of digital signal processors 10, 11. All digital signal processors 10, 11 are identical and have identical connections to their neighbors, but for the sake of clarity only one of the digital signal processors 11 and the part of the connections 12*a-d*, 14*a-d* that connects this digital signal processor 11 to its neighbors is shown in detail. Digital signal processor 11 contains an input multiplexer 16 and further circuits 18. Write output connections 12*a-d* from neighboring digital signal processors 10 are coupled to input multiplexer 16, which has a single output coupled to further circuits 18. Although an input multiplexer 16 is shown, it should be understood that any shared input, such as for example a bus structure that couples the write output connections 12*a-d* of the neighboring digital signal processors 10 may be used.

Figure 2:
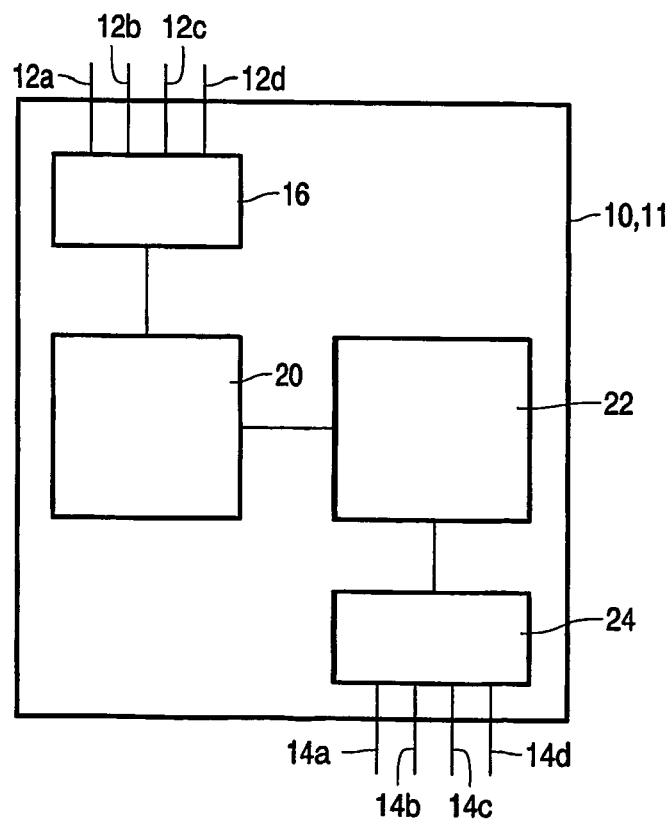
FIG. 2 shows an embodiment of a digital signal processor

FIG. 2 shows a digital signal processor 10, 11 in more detail. Digital signal processor 10, 11 contains multiplexer 16, a memory 20, a processing circuit 22 and an output circuit 24. The output of multiplexer 16 is coupled to an input port of memory 20. Processing circuit 22 is coupled to an input/output port of memory 20 and to an input of output circuit 24.

Output circuit 24 has outputs coupled to the outputs 14a-d of digital signal processor 10, 11 that are coupled to the neighboring digital signal processors 10, 11.

In operation each of the digital signal processors 10, 11 executes its own program of instructions. A typical set of programs implement a data flow task. A data flow task comprises a number of operations that have to be executed repeatedly, each time using a respective set of one or more data items as input and producing another data item as a result. In a data flow task the data flow items produced as a result of executing some of the operations are used as input data items for other operations. This type of data flow task lends itself to implementation on a matrix of processors as shown in FIG. 1. Different digital signal processors 10, 11 are programmed to execute different ones of the operations, and to write the resulting data items to the memory 20 or memories of those digital signal processors 10, 11 that use these data items as inputs for their operations. The latter digital signal processors 10, 11 read these results for use in their operation from their local memory 20.

At certain points the program of a digital signal processor 10, 11 contains instructions to write data to specified other digital signal processors 10, 11, e.g. in the form of a LOAD instruction to load data into a register number associated with a predetermined digital signal processors 10, 11. When a digital signal processor 10, 11 encounters such an instruction it sends the data to output circuit 24, together with a selection signal to indicate to which one of output connections 14a-d the data should be supplied. In response output circuit 24 outputs the data at the specified one of the output connections 14a-d. Multiplexer 16 of the target digital signal processor 10, 11 to which the selected output connection 14a-d is connected passes the data and writes the data into the memory 20 in the target digital signal processor 10, 11. The connection that is used for writing is designed for writing only: no data can be read back from the target digital signal processor 10, 11 along this connection. If the target digital signal processor 10, 11 has to write back data to the original digital signal processor 10, 11, a different connection has to be used, via memory 20. Once the data has been written into memory 20 it is available for use by target digital signal processor 10, 11.

Figure 3:
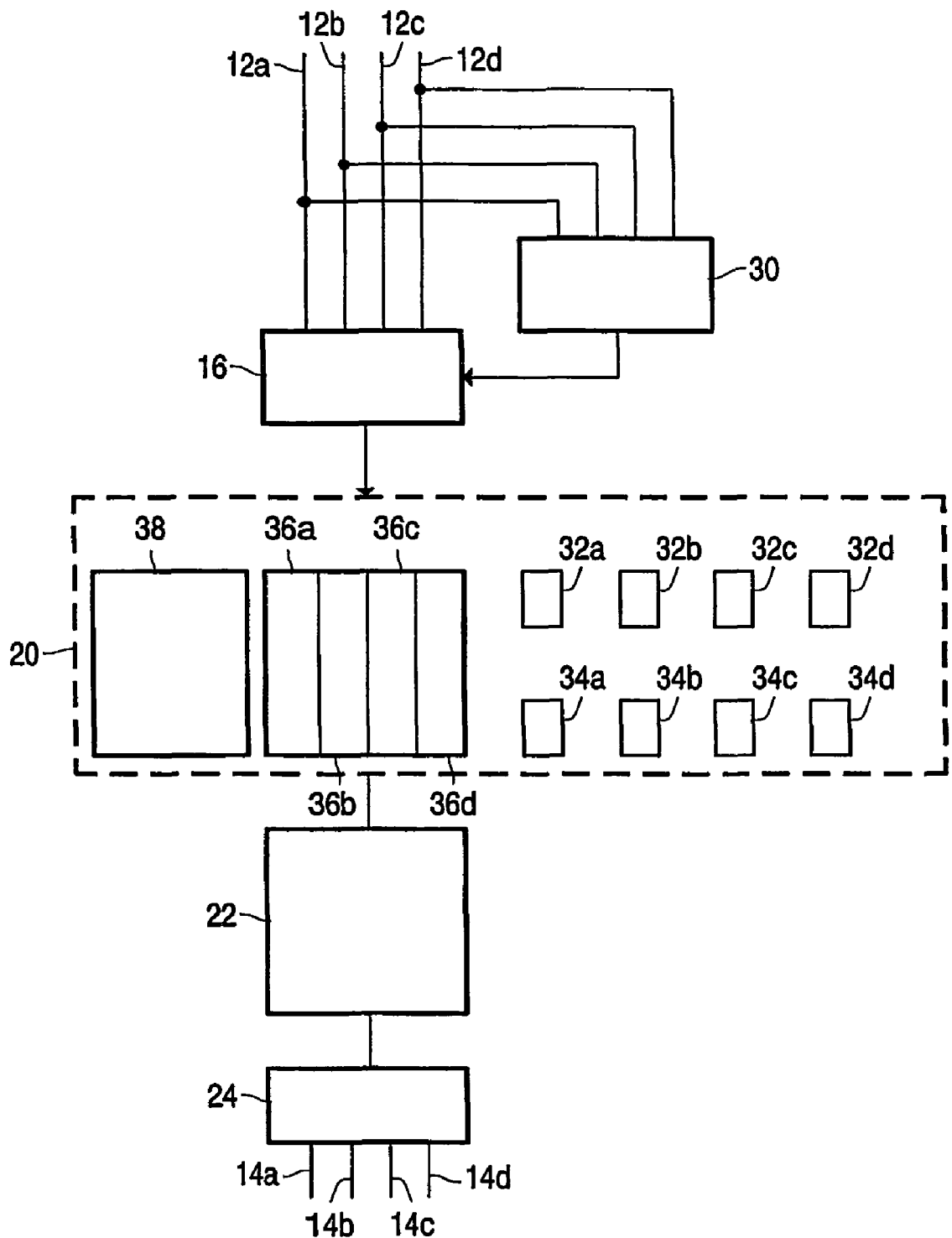
FIG. 3 shows a further embodiment of a digital signal processor

FIG. 3 shows a further embodiment of the digital signal processor 10, 11. In this embodiment an arbiter 30 has been added and details of memory 20 are shown. Arbiter 30 is coupled to inputs 12a-d to determine from which of inputs 12a-d data will be written to memory 20. In this embodiment output circuit 24 transmits a request to write prior to writing. (for the sake of clarity only one line is show for each input 12a-d, symbolizing a plurality of lines for parallel data and for a request signal in this embodiment).

Arbiter 30 receives the requests and determines from which input 12a-d data will be written. When arbiter 30 receives a request from only one neighboring digital signal processor 10, 11, arbiter 30 signal to couple the corresponding input 12a-d to memory 20. When more than one request is received at the same time arbiter selects one input 12a-d. Preferably, a round robin scheme is used for selection: successively lower priorities are assigned respective ones of the inputs 12a-d, the request of the requester with highest priority is granted and subsequently lowest priority is assigned to the input that was previously assigned highest priority, the other priorities remaining the same relative to one another. Thus, in successive time slots each time a different inputs gets highest priority until all inputs have had highest priority, after which the process repeats. Of course, other priority schemes can be used as well, such as fixed or programmable relative priorities, each time assigning lowest relative priority to the last input that has won arbitration etc. Another type of scheme is a budget based scheme, in which any priority may be used for any processor 10, but this priority is lowered to a minimum value once a measure of the number of times that the processor 10 has gained access exceeds budgeted value. For example if the processor 10 has gained access more than predetermined number of times during a time-slot, or when a running average of the number of gained accesses exceeds a threshold.

Memory 20 is shown to contain buffer areas 36a-d for respective ones of the inputs 12a-d, buffer administration areas 32a-d for respective ones of the buffer areas 36a-d, further buffer administration areas 34a-d, each corresponding to a respective one of the outputs 14a-d and a working area 38. In an example each administration area 32a-d contains locations for a buffer start address, a buffer end address and a data start and a data end address for a respective one of the inputs. A copy of the data in administration area 32a-d is retained in one of the further buffer administration areas 34a-d of the digital signal processor 10,11 that is coupled to the input 12a-d. Thus, each further buffer administration area 34a-d corresponds to a respective one of the outputs 14a-d that is connected to the digital signal processor 10,11 that contains the buffer area 36a-d administered by the further buffer administration area 34a-d.

When processing circuit 22 writes data to an output 14a-d, processing circuit 22 uses the further administrative area 34a-d for the corresponding output 14a-d to control writing. For example, this may involve supplying write addresses via output 14a-d starting from the data end address retrieved from further administrative area 34a-d, wrapping around when the buffer end address is reached, or suspending reading when the data start address is reached. Subsequently, processing circuit 22 updates the further administrative area 34a-d and the administrative area 32a-d in the target digital signal processor 10, 11.

When processing circuit 22 reads data from one of its buffer areas 36a-d, it controls reading using the corresponding administrative area 32a-d. If necessary processing circuit 22 updates the administrative area 32a-d and writes an update to further administrative area 34a-d in the digital signal processor 10, 11 that is connected to the corresponding input 12a-d (this is done via one of the outputs 14a-d that is connected to this digital signal processor 10, 11).

It should be appreciated that any kind of writing scheme may be used. In the example given above, a cyclic buffer scheme was used (first in first out). Instead a stack scheme (last in first out) may be used or a mapping scheme with fixed addresses for writing specific parameters etc. The administration data is particular to the writing scheme.

Moreover, in some writing schemes it is not necessary to retain copies of all administrative data in an administrative area 32a and a further administrative area 34b. For example, in an embodiment the addresses used for writing data from inputs 12a-d into memory 20 are controlled internally using a starting address from the local administrative area 32a-d for that input. In this case, the digital signal processor 10, 11 contains a write circuit (not shown), which uses the selection from arbiter 30 to select the administrative area 32a-d for the selected input 12a-d, retrieves administrative data from the selected administrative area 32a-d and supplies addresses to memory on the basis of this administrative data. Thus no addresses are needed from input 12a-d in case of a cyclic buffer scheme, or a stacking scheme for example. In this case the digital signal processor 10, 11 that writes the data to input 12a-d need not supply an address, nor does its further administrative area 34a-d need to store a buffer start and end address. In principle an indicator of the amount of free buffer memory suffices in further administrative area 34a-d in this case.

It will be appreciated that all kinds of variations are possible. For example a short relative address may be supplied via output 14a-d to address relative to a buffer start address defined in an administrative area, or relative buffer addresses and buffer size data, but no buffer start or end addresses may be stored in administrative area 34a-d or further administrative area 34a-d.

In a further embodiment a plurality of buffer areas 36a-d, administrative areas 32a-d and further administrative areas 34a-d is used for different communication protocols via the same connection between an output 14a-d and an input 12a-d. For example one such set may be provided for a cyclic buffer protocol and another for a mapping scheme.

It will be appreciated that the various memory areas can be realized in many ways, for example all in a larger memory so that all areas can be addressed via the same address input, or in separate memories, for example using registers as memory for the part or all of the administrative areas 32a-d, 34a-d, or separate memories, each with its own address input. Similarly, although separate connections to memory 20 are shown for multiplexer 16 and processing circuit 22, it will be appreciated that a shared memory port may be used, which may require further arbitration. Similarly, instead of an output circuit 24 coupled to processing circuit 22 an autonomously operable output circuit directly coupled to memory 20, for transferring data from a buffer in response to a command from processing circuit 22.

In principle, further buffer areas may be provided for local writing and reading within one digital signal processor 10, 11. Thus, communication between operations performed by the same digital signal processor 10, 11 can be treated in the same way as communication between operations that are executed on different ones of the digital signal processors 10, 11. In an embodiment, a separate memory may be provided for such local writing.

It will be appreciated that many alternative implementations are possible. For example, the invention is of course not limited to the number of digital signal processors shown in FIG. 1 more or fewer digital signal processors may be used. More digital signal processors may be connected to an input multiplexer 16, for example eight surrounding processors, or even more. Also wormhole connections to non-neighboring processors may be provided. Instead of multiplexers 16 other multiplexing circuits may be used such as busses that connect the outputs 14a-d of different digital signal processors 10, 11.

Thus, each processor 10 writes data for other processors directly from the processor, without storing the data in its memory 20 first for handling by an I/O processor (e.g. DMA controller). The same processor reads data from other processors 10 via memory, where the data is received via a multiplexed input that does not share resources with the output of the processor 10.

The invention claimed is:

1. An integrated circuit comprising a plurality of digital signal processors, each comprising a signal processing core, a memory coupled to the processing core, a multiplexed data input coupled to the memory, for writing received data into the memory, and an output circuit with an input coupled to the signal processing core and a plurality of outputs for outputting data from the signal processing core; a remote write only structure coupling outputs of respective groups of the digital signal processors each to the multiplexed data input of a respective particular digital signal processor for that respective group, the respective group for the particular digital signal processor not including the particular digital signal processor.

2. An integrated circuit according to claim 1, wherein the digital signal processors are arranged in a two-dimensional matrix on the integrated circuit, and wherein for each particular digital signal processor the respective group of the digital signal processors whose outputs are coupled to the multiplexed data input of the particular digital signal processor consists of neighbors immediately adjacent to the particular digital signal processor in the matrix.

3. An integrated circuit according to claim 1, wherein the respective group for each particular digital signal processor contains all of the digital signal processors except that particular digital signal processor.

4. An integrated circuit according to claim 1, wherein each digital signal processor is programmed with a respective application program, the respective group for each particular digital signal processor containing only the digital signal processors that are programmed with programs that contain instructions to write to that particular digital signal processor.

5. An integrated circuit according to claim 1, wherein the memory of each particular digital signal processor comprises a plurality of buffer areas, each for receiving data written by a respective one of the group of digital signal processors whose outputs are coupled to the input of the particular digital signal processor, a first plurality of administration areas each containing administration information for administering a respective one of the buffer areas in the particular digital signal processor; a second plurality of administration areas each containing administration information for administering the buffer area for data from the particular digital signal processor in a respective one of the digital signal processor to which the particular digital signal processor is coupled via the remote write only structure.

6. An integrated circuit according to claim 5, wherein at least a first one of the digital signal processors is arranged to perform communication with a second one of the digital signal processors using a plurality of different communication protocols, the second one of the digital signal processors comprising a further plurality of buffer areas, each for receiving data written by the first one of the digital signal processors using a respective one of the protocols.

7. An integrated circuit according to claim 1, wherein each digital signal processor comprises an arbiter coupled to the multiplexed data input, for arbitrating requests to write data from respective ones of the group of the digital signal processors whose outputs are coupled to the multiplexed data input, according to a round robin arbitration scheme.

8. An integrated circuit according to claim 1, wherein each digital signal processor comprises an arbiter coupled to the multiplexed data input, for arbitrating requests to write data from respective ones of the group of the digital signal processors whose outputs are coupled to the multiplexed data input, according to a budget based arbitration scheme.

9. An integrated circuit according to claim 1, wherein each digital signal processor comprises an arbiter coupled to the multiplexed data input, for arbitrating requests to write data from respective ones of the group of the digital signal processors whose outputs are coupled to the multiplexed data input, according to a priority based arbitration scheme.

* * * * *